US007587371B2

(12) United States Patent
Murata et al.

(10) Patent No.: US 7,587,371 B2
(45) Date of Patent: Sep. 8, 2009

(54) CHARGING METHOD AND IMAGING APPARATUS FOR EQUITABLE AND SIMPLE CHARGING

(75) Inventors: Mikuni Murata, Kanagawa (JP); Tohru Shimizu, Chiba (JP)

(73) Assignee: Ricoh Company, Ltd., Tokyo (JP)

( * ) Notice: Subject to any disclaimer, the term of this patent is extended or adjusted under 35 U.S.C. 154(b) by 304 days.

(21) Appl. No.: 10/365,390

(22) Filed: Feb. 13, 2003

(65) Prior Publication Data
US 2003/0182248 A1 Sep. 25, 2003

(30) Foreign Application Priority Data
Mar. 25, 2002 (JP) .............................. 2002-084551

(51) Int. Cl.
 *G06Q 99/00* (2006.01)
(52) U.S. Cl. .............................. 705/400; 705/1; 705/14; 713/323; 399/6
(58) Field of Classification Search ................... 705/14, 705/34, 4, 8, 400, 1; 235/375; 713/200, 713/323; 399/6; 385/1.15
See application file for complete search history.

(56) References Cited

U.S. PATENT DOCUMENTS

| 6,124,938 | A | 9/2000 | Rabb et al. | ................. | 358/1.15 |
|---|---|---|---|---|---|
| 6,301,666 | B1 * | 10/2001 | Rive | .............................. | 726/27 |
| 6,404,994 | B1 * | 6/2002 | Kawai et al. | .................... | 399/6 |
| 6,484,934 | B2 * | 11/2002 | Salgado | ....................... | 235/375 |
| 6,925,574 | B2 * | 8/2005 | Satoh | ......................... | 713/323 |
| 6,938,007 | B1 * | 8/2005 | Iulianello et al. | .............. | 705/34 |
| 7,016,617 | B2 * | 3/2006 | Koike | ............................ | 399/8 |
| 2001/0056413 | A1 * | 12/2001 | Suzuki et al. | .............. | 705/418 |
| 2002/0017570 | A1 * | 2/2002 | Shinkai | ..................... | 235/492 |
| 2002/0040334 | A1 * | 4/2002 | Yamazaki | .................... | 705/34 |
| 2002/0057451 | A1 * | 5/2002 | Ishijima | ..................... | 358/1.15 |
| 2002/0120508 | A1 * | 8/2002 | Matsumoto et al. | ........... | 705/14 |
| 2002/0161600 | A1 * | 10/2002 | Stubiger et al. | ................ | 705/1 |
| 2004/0075858 | A1 * | 4/2004 | Namizuka | .................. | 358/1.13 |
| 2004/0204986 | A1 * | 10/2004 | Shimbori et al. | .............. | 705/14 |
| 2005/0240788 | A1 * | 10/2005 | Satoh | ......................... | 713/323 |

FOREIGN PATENT DOCUMENTS

| CA | 2292110 | | 6/2001 |
|---|---|---|---|
| EP | 0 996 041 | | 4/2000 |
| EP | 1 174 271 | | 1/2002 |
| JP | 11272350 | * | 8/1999 |
| JP | 11272350 | A * | 10/1999 |
| JP | 2001/306775 | | 11/2001 |
| WO | WO 00/62233 | | 10/2000 |

OTHER PUBLICATIONS

Knight, Robert, "EDI Hitting Stride in Data Entry", Feb. 1992, Software Magazine, vol. 12, Iss. 6; Part 2. p. 23, 2 pgs.*
Http://www.metrics.com/News/1997/970904-PAS.html, XP-002269538, 2 pages, "Printer Accounting Server 1.1 Released", Sep. 4, 1997.
W. Wong, http://www.winnetmag.com/Article/ArticleID/3137/3137.html, XP-002269539, 2 pages, "Printer Accounting Server 1.1", Apr. 1998.
Http://web.archive.org/web/19991103214042/www.metrics.com/Products/PAS/Features, 2 pages, "Features and Functionality", Nov. 3, 1999.

* cited by examiner

*Primary Examiner*—John W Hayes
*Assistant Examiner*—Freda A Nelson
(74) *Attorney, Agent, or Firm*—Oblon, Spivak, McClelland, Maier & Neustadt, P.C.

(57) ABSTRACT

A charging method using a use point that is a unit, common to a plurality of apparatuses, of charging according to use thereof includes the steps of (a) converting a result of use of each of functions of each of the apparatuses to use points, (b) totaling the use points of each of the apparatuses obtained in the step (a) based on a predetermined unit, and (c) charging for use of each of the apparatuses based on the use points totaled in the step (b).

28 Claims, 6 Drawing Sheets

CHARGING METHOD AND IMAGING APPARATUS FOR EQUITABLE AND SIMPLE CHARGING

BACKGROUND OF THE INVENTION

1. Field of the Invention

The present invention generally relates to charging methods and imaging apparatuses, and more particularly to a method of charging with a "use point" that is a common unit of charging for use of apparatuses and/or services and an imaging apparatus supporting such a method.

2. Description of the Related Art

Conventionally, copier charges are made according to the number of copies made by the copier. In the case of making N copies for A yen per copy, for instance, A times N yen are charged in total. A bill collector is informed of the number of copies made by a user and charges the user accordingly.

However, in the case of charging according to the number of copies, a color copy and a monochrome copy have different unit prices.

Therefore, the bill collector, receiving information or notification of the number of copies, calculates charges for color copies and monochrome copies separately based on their respective numbers. Then, the bill collector adds up the respective charges so as to charge the user.

In this case, however, the user may be charged a wrong amount due to the occurrence of an error in reading the values of their respective counters or in informing the bill collector of the read value of each counter. First of all, reading and reporting the counter value cost time and trouble.

Recent multi-function printers (MFPs) include a built-in hard disk (HD). The MFP enables a user to store an image read by the scanner function in the HD and to distribute the stored image to other apparatuses through a network. Further, the image stored in the HD can be stored via the network in an image data storage server. Moreover, the MFP itself can be used as an image data storage server connected to the network.

Such a high-performance MFP requires services that cannot be charged for by the conventional method of charging according to the number of copies or printouts. Such services include upgrading of MFP software and provision of instructions on how to operate the MFP.

Further, in a high-performance MFP, even a price system for a service measurable by the number of copies or printouts is complicated and thus difficult for clients to understand. It is expected that this may cause an increase in management cost.

SUMMARY OF THE INVENTION

Accordingly, it is a general object of the present invention to provide a charging method and an imaging apparatus in which the above-described disadvantage is eliminated.

A more specific object of the present invention is to provide an appropriate, equitable, and simple method of charging for use of apparatuses and/or services and an imaging apparatus supporting such a method.

The above objects of the present invention are achieved by a charging method using a use point that is a unit, common to a plurality of apparatuses, of charging according to use thereof, the charging method including the steps of (a) converting a result of use of each of functions of each of the apparatuses to use points, (b) totaling the use points of each of the apparatuses obtained in the step (a) based on a predetermined unit, and (c) charging for use of each of the apparatuses based on the use points totaled in the step (b).

According to the above-described charging method, charging for the use of an apparatus is performed based on the totaled use points to which the use of the functions of the apparatus is converted. Therefore, even when an apparatus has multiple functions, charging can be performed appropriately, equitably, and simply for the use of the apparatus.

The above objects of the present invention are also achieved by a charging method using a use point that is a unit, common to a plurality of services, of charging according to use thereof, the charging method including the steps of (a) converting a result of use of each of the services to use points, (b) totaling the use points of the services obtained in the step (a) based on a predetermined unit, and (c) charging for the use of the services based on the use points totaled in said step (b).

According to the above-described charging method, services such as MFP software upgrading and provision of MFP operating instructions, which cannot be charged for by the conventional method, can be charged for appropriately, equitably, and simply.

The above objects of the present invention are also achieved by a charging method using a use point that is a unit, common to use of an apparatus and a service, of charging according to the use thereof, the charging method including the steps of (a) converting a result of use of each of the apparatus and the service to use points, (b) totaling the use points of the apparatus and the service obtained in the step (a) based on a predetermined unit, and (c) charging for the use of the apparatus and the service based on the use points totaled in the step (b).

According to the above-described charging method, a charge for the use of an apparatus and a charge for the use of a service are totaled when the charges are made. Therefore, a payment can also be made for the totaled charges. This saves time and trouble in making a charge and a payment for the use of an apparatus and a service.

The above objects of the present invention are further achieved by an imaging apparatus outputting a use point that is a unit, common to a plurality of apparatuses, of charging according to use thereof, the imaging apparatus including: a conversion part converting a result of use of each of functions of the imaging apparatus to use points; a totaling part totaling, based on a predetermined unit, the use points of the functions obtained in the conversion part; and an output part outputting the use points totaled in the totaling part.

The above-described imaging apparatus can be suitably used in any of the above-described charging methods according to the present invention.

BRIEF DESCRIPTION OF THE DRAWINGS

Other objects, features and advantages of the present invention will become more apparent from the following detailed description when read in conjunction with the accompanying drawings, in which.

DETAILED DESCRIPTION OF THE PREFERRED EMBODIMENTS

A description will now be given, with reference to the accompanying drawings, of an embodiment of the present invention.

First, a description will be given, with reference to FIG. 1, of a basic concept of the present invention. A charging method for the MFP, for instance, will be described.

[Basic Operation Flow]

Figure 1:
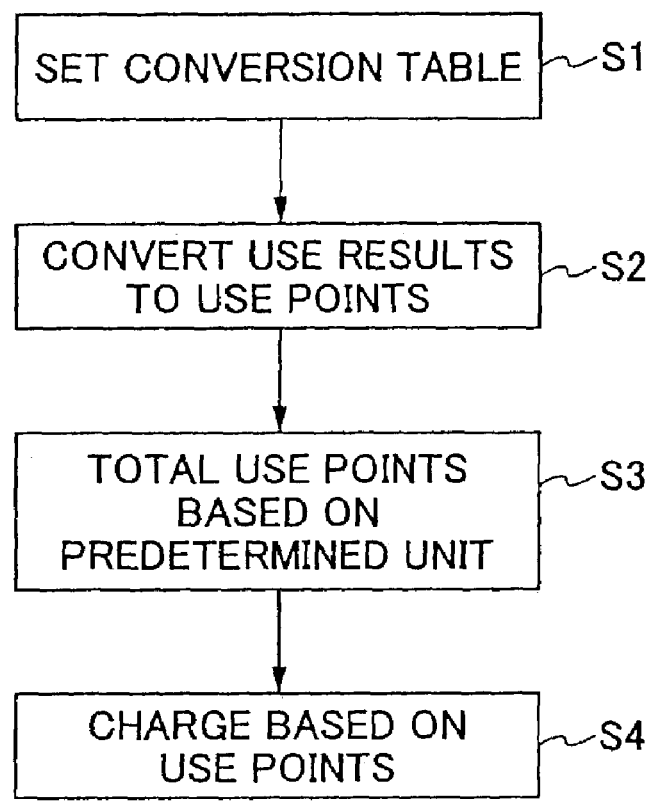
FIG. 1 is a flowchart for illustrating a basic concept of the present invention.

In step S1 of FIG. 1, a "use point" is set with respect to each function of the MFP. The use point is a unit of charging for use of each function of the MFP. For instance, the use point, as a charging unit, is set with respect to each of one printout, one A3 copy, one A4 copy, and one A4 duplex copy. The use point system may be set so that a point is added for every predetermined black area (6%, for instance) of the entire copy area. Another use point system is set for color copying. The set contents of the use point system are stored in a memory as a conversion table.

In step S2, every time the MFP is used, referring to the conversion table, the state of use (time length, the number of times, etc.) of each function is converted to the corresponding use points to be stored in the memory. Next, in step S3, the use points of the functions are totaled based on a predetermined unit at predetermined intervals. Then, in step S4, a charge is made based on the totaled use points of the functions.

The use point may be used in common with other apparatuses or services. In this case, the use points may be totaled according to a unit of collecting bills (a bill collection unit) or a unit suitable for collecting bills.

[Operation Flow of the Present Invention]

A description will be given, with reference to FIG. 2, of an operation flow of the present invention.

Figure 2:
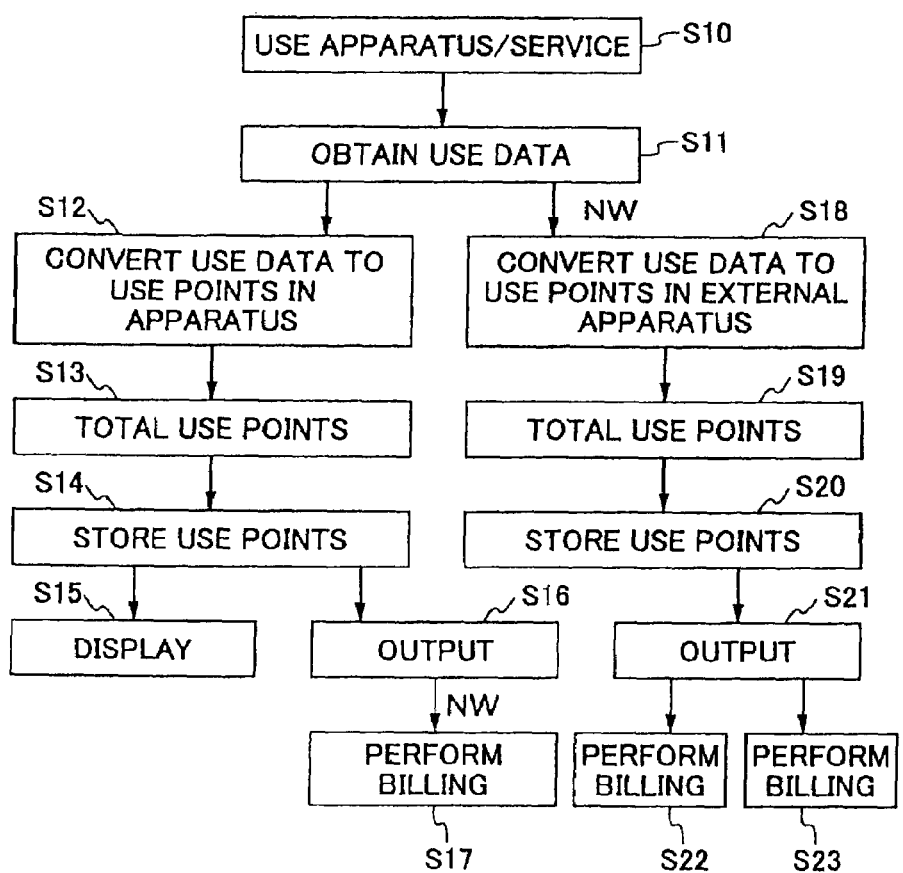
FIG. 2 is a flowchart of an operation according to an embodiment of the present invention.

In step S10 of FIG. 2, an apparatus and/or a service is used. In step S11, data on the use of the apparatus and/or the service (hereinafter referred to as use data) is obtained. The use data may be automatically generated by the apparatus used or input through a terminal (which may be the apparatus used if the apparatus used can function as a terminal). Thereafter, the operation flow is divided into four parts according to the following cases.

(a) [In The Case Where The Apparatus Used Totals And Displays The Use Points]

In step S12, the apparatus used, which includes a memory storing the conversion table, refers to the conversion table and converts the obtained use data to use points. In step S13, the apparatus used totals the use points based on a predetermined unit at predetermined intervals. Next, in step S14, the apparatus used stores the totaled use points, and in step 15, displays the totaled use points as required on the display unit of the apparatus or an external display.

A charge is made based on the displayed value. Thereby, the use point value or the sum of the use points of the functions of each apparatus can be known.

(b) [In The Case Where The Apparatus Used Totals The Use Points And An External Apparatus Uses The Totaled Use Points]

In step S12, the apparatus used, which includes a memory storing the conversion table, refers to the conversion table and converts the obtained use data to use points. In step S13, the apparatus used totals the use points based on a predetermined unit at predetermined intervals. Next, in step S14, the apparatus used stores the totaled use points in a predetermined memory. Then, in step S16, accessed by the external apparatus, the apparatus used outputs the use points stored in the memory. In step S17, the external apparatus performs billing based on the use points.

The external apparatus of the operation flow (b) is preferably a charging and/or billing system. In this case, charging and/or billing can be performed efficiently with a reduced amount of charging and/or billing data.

(c) [In The Case Where An External Apparatus Totals The Use Data And Converts The Use Data To Use Points So As To Perform Charging And/or Billing Based On The Use Points]

The external apparatus accesses each apparatus via a network and collects the use data.

In step S18, the external apparatus, which includes a memory storing the conversion table, refers to the conversion table and converts the use data collected from the apparatus used to use points. In step S19, the external apparatus totals the use points based on a predetermined unit such as a bill collection unit at predetermined intervals. Next, in step S20, the external apparatus stores the totaled use points in a predetermined memory. Then, in step S21, the external apparatus outputs the stored use points at a predetermined date and time, and in step S22, the external apparatus performs billing based on the use points.

The external apparatus of the operation flow (c) is a system for collecting information on the state of each apparatus used as well as for charging and billing. In this case, the system for collecting information on the state of each apparatus used includes the charging and billing functions so as to be capable of performing information collecting, charging, and billing with more efficiency.

(d) [In The Case Where An External Apparatus Collects The Use Data And Converts The Use Data To Use Points So That a Billing Apparatus Performs Billing Based On The Use Points]

The external apparatus such as a use data collection center accesses each apparatus via a network and collects the use data.

In step S18, the external apparatus, which includes a memory storing the conversion table, refers to the conversion table and converts the use data collected from the apparatus used to use points. In step S19, the external apparatus totals the use points based on a predetermined unit such as a bill collection unit at predetermined intervals. Next, in step S20, the external apparatus stores the totaled use points in a predetermined memory. Then, in step S21, accessed by the billing apparatus, the external apparatus outputs the stored use points, and in step S23, the billing apparatus performs billing based on the use points.

The external apparatus of the operation flow (d) collects information on the state of each apparatus used and converts the information to use data. Then, the external apparatus makes a charge based on the result of the conversion. Therefore, the functions are distributed so as to realize a very expansive system. Instead of the external apparatus, the billing apparatus may total the use points based on a predetermined unit at predetermined intervals in step S19.

[System Configuration]

Figure 3:
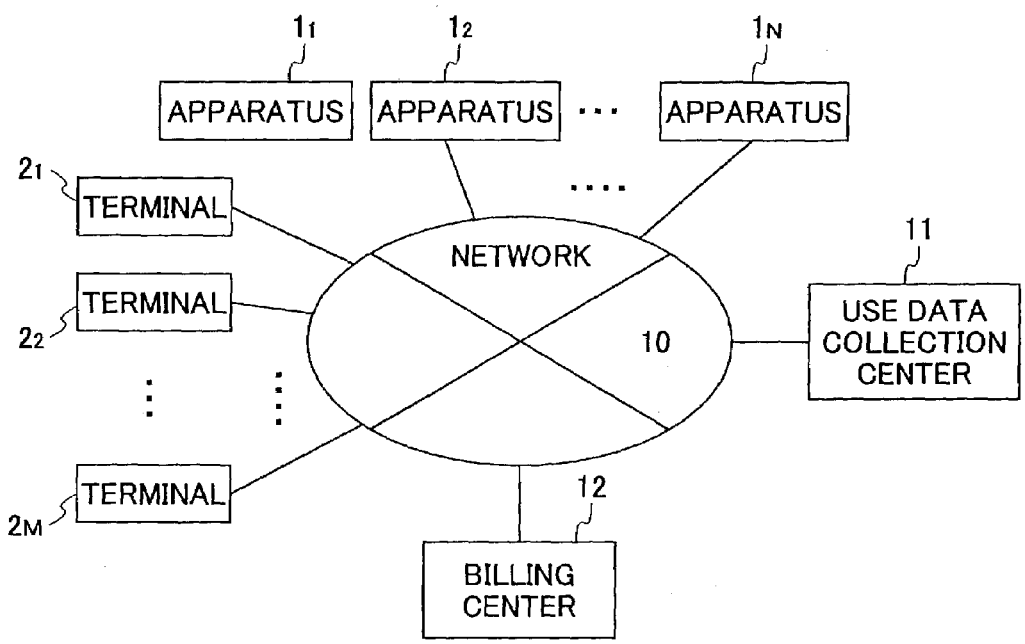
FIG. 3 is a diagram showing a system configuration according to the embodiment of the present invention.

FIG. 3 is a diagram showing a system configuration in the above-described case (d).

The system of FIG. 3 includes apparatuses $1_1$ through $1_N$ for use, system user terminals $2_1$ through $2_M$, a communication network 10, a use data collection center 11, and a billing center 12. The use data collection center 11 may include the function of the billing center 12.

The network 10 is a communication network such as the Internet. The apparatuses $1_1$ through $1_N$ are MFPs, personal computers, printers, copiers, and facsimile machines, for instance. These apparatuses are products of a plurality of manufactures. The system user terminals $2_1$ through $2_M$ are used to input data on apparatus and/or service use and to access the use data collection center 11 or the billing center 12 so as to obtain the present use points or the use points for a predetermined period of time. The system user terminals $2_1$ through $2_M$ may be connected directly to the use data collection center 11 or the billing center 12. Further, each of the apparatuses $1_1$ through $1_N$ may include the system user terminal function.

The use data collection center 11 obtains the use data from the apparatuses $1_1$ through $1_N$, such as information on the use thereof and information on supplies therefor, and converts the use data to use points referring to the conversion table. Further, the use data collection center 11 totals the use points (use point value) of each of the apparatuses $1_1$ through $1_N$ based on a predetermined unit such as a bill collection unit at predetermined intervals. The use data collection center 11 stores the totaled use points in a predetermined memory. Accessed by the billing center 12, the use data collection center 11 outputs the use points stored in the memory. Based on the use points, the billing center 12 bills the users of the apparatuses $1_1$ through $1_N$ for the use thereof. The totaling of the use points may be performed by the billing center.

[Configuration of Each of The Apparatuses $1_1$ Through $1_N$ of The System of FIG. 3]

Figure 4:
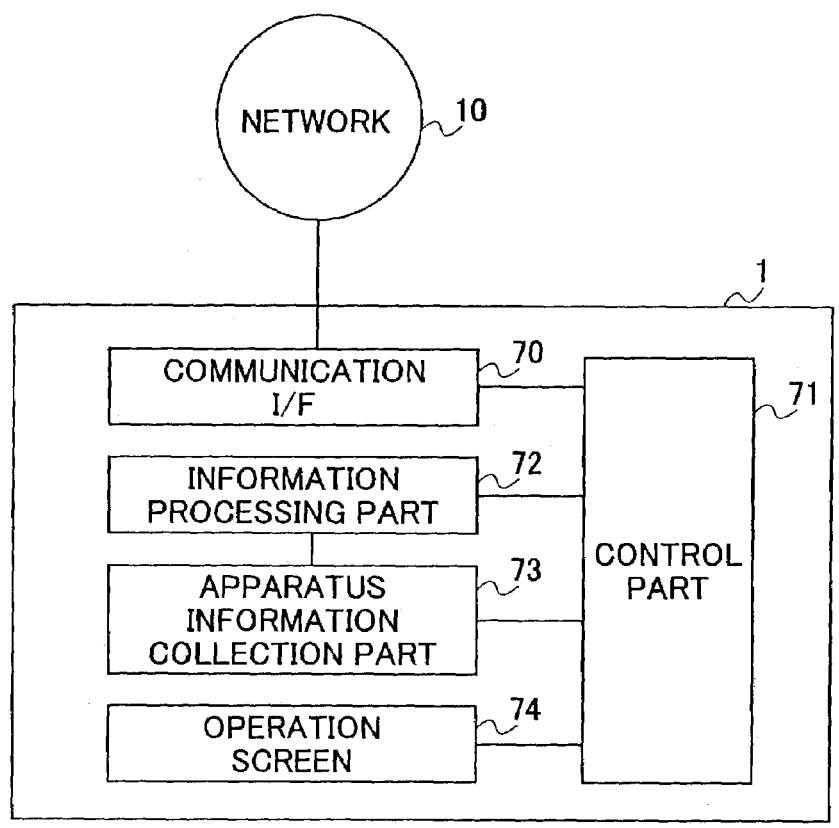
FIG. 4 is a block diagram showing a configuration of an apparatus of the system of FIG. 3 according to the embodiment of the present invention.

FIG. 4 is a block diagram showing a configuration of each of the apparatuses $1_1$ through $1_N$ of the system of FIG. 3. The apparatus of FIG. 4 is referred to as an apparatus 1 for convenience of description. The use data of the apparatus 1 obtained thereby is automatically transmitted therefrom to the use data collection center 11. A client may input the use data and obtain the use point value of the apparatus 1, using its operation screen.

The apparatus 1, which is an apparatus for office or home use, such as an MFP, a printer, a copier, or a facsimile machine, includes a communication interface (I/F) 70, a control part 71, an information processing part 72, an apparatus information collection part 73, and an operation screen 74 in its main body.

The control part 71 controls the entire apparatus 1. In addition, the control part 71 further controls the communication interface 70, the information processing part 72, the apparatus information collection part 73, and the operation screen 74.

The information processing part 72 performs processing related to the collection of the use points.

The apparatus information collection part 73 collects information including the use data of the apparatus 1 and transmits the collected information to the use data collection center 11 via the communication interface 70.

The information transmitted to the use data collection center 11 is expressed in an information code. The collected information is stored temporarily in the apparatus information collection part 73 and is transmitted to the use data collection center 11 in a predetermined transmission format corresponding to the network 10.

Figure 5:
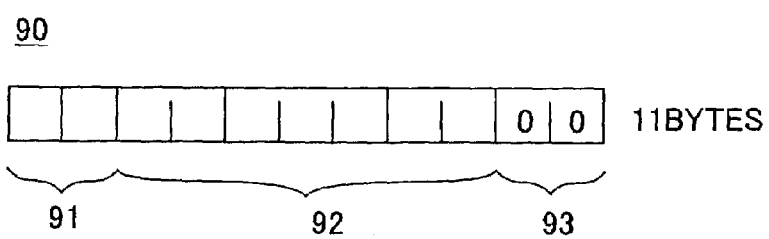
FIG. 5 is a diagram for illustrating a transmission format according to the embodiment of the present invention.

FIG. 5 shows an information code 90, which is one configuration of the information code of this embodiment. The information code 90 of FIG. 5 is formed of 11 bytes. The first and second bytes indicate a classification code 91, the third through ninth bytes indicate a mode code 92 showing the contents of the information, and the tenth and eleventh bytes form bytes 93 reserved for use by the use data collection center 11. In the apparatus 1, "00" is inserted in the bytes 93. For instance, information whose first byte has a value "1" indicates the state, the operation history, and the copy number history of the apparatus 1 and can be read only from the use data collection center 11. On the other hand, information transmitted from the apparatus 1 when the apparatus 1 needs repairing or maintenance has a first-byte value "2". Further, information that can be read by the use data collection center 11 as required without being transmitted from the apparatus 1, such as failure or alarm information, has a first-byte value "3".

The operation screen 74 is formed of a touch panel. By following instructions displayed on the operation screen 74, the apparatus and/or service use data can be input, and the use data collection center 11 or the billing center 12 is accessed so that the present use data or the use data for a predetermined period of time can be obtained.

[Configuration of The Use Data Collection Center 11 of The System of FIG. 3]

Figure 6:
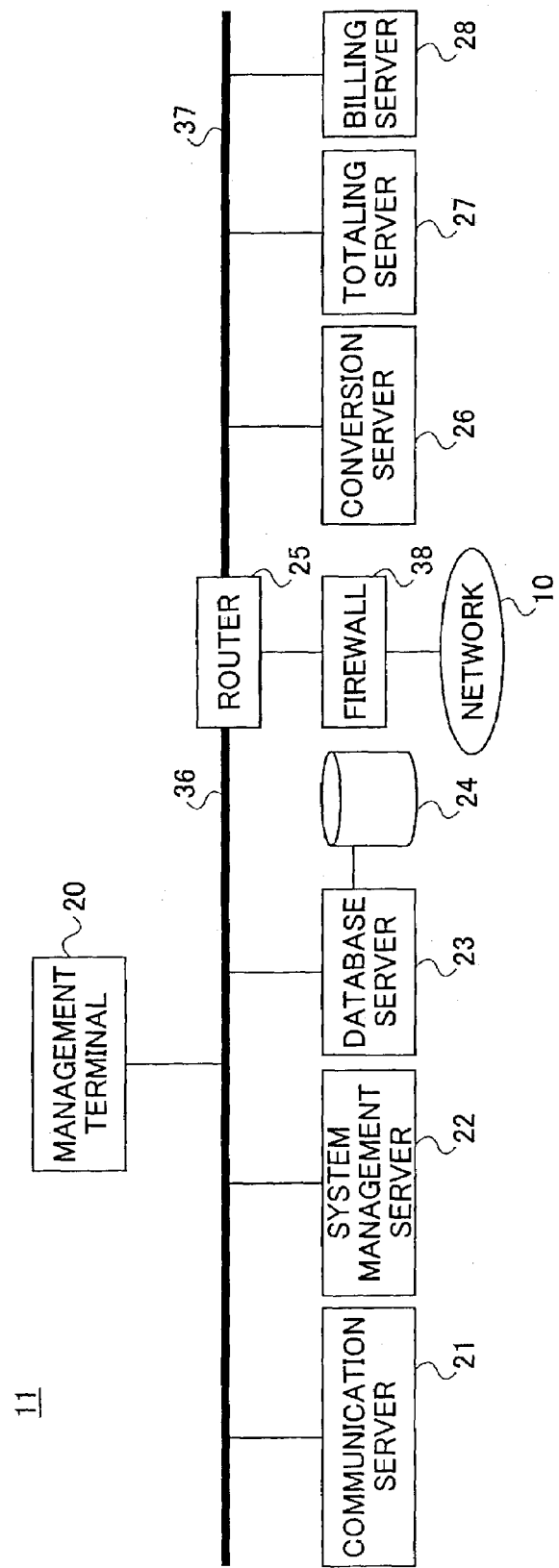
FIG. 6 is a block diagram showing a configuration of a use data collection center of the system of FIG. 3 according to the embodiment of the present invention.

FIG. 6 is a block diagram showing a configuration of the use data collection center 11. In this configuration, the use data collection center 11 includes the function of the billing center 12.

The use data collection center 11 of FIG. 6 includes a management terminal 20, a communication server 21, a system management server 22, a database server 23, a database 24, a router 25, a conversion server 26, a totaling server 27, a billing server 28, local area networks (LANs) 36 and 37, and a firewall 38.

The management terminal 20 is a terminal for controlling the use data collection center 11. The communication server 21, which communicates with the apparatuses $1_1$ through $1_N$ directly or via the network 10, receives the use data of the apparatuses $1_1$ through $1_N$ therefrom. Further, at the request of any of the apparatuses $1_1$ through $1_N$, the communication server 21 transmits thereto its present use point value or its use point value for a predetermined period of time.

The system management server 22 manages the entire use data collection center 11 of FIG. 6. The database server 23 manages the database 24. The database server 23, for instance, stores, as required: a (conversion) table correlating each apparatus use and/or each service use with its corresponding use point as a charging unit; the use points (use point values) recorded client by client, apparatus by apparatus, and function by function in a bill collection unit; client information; apparatus information; and use state information. The database 24 stores data used in the conversion server 26, the totaling server 27, and the billing server 28. The firewall 38 ensures security in the connection with the network 10.

The conversion server 26, referring to the conversion table stored in the database server 23, converts the use data of each of the apparatuses $1_1$ through $1_N$ obtained thereby to use points. The totaling server 27 totals the use points of each of the apparatuses $1_1$ through $1_N$ based on a predetermined unit at predetermined intervals. The billing server 28, based on the use points totaled by the totaling server 27, bills the user of each of the apparatuses $1_1$ through $1_N$ for the use thereof.

According to the above-described system, when the apparatus 1 is used, the use data of the apparatus 1 is transmitted therefrom to the use data collection center 11 at any time, periodically, or at the request of the use data collection center 11. Thereafter, the conversion server 26, referring to the conversion table stored in the database server 23, converts the received use data to use points, and stores the use points in the database server 23. Next, the totaling sever 27 totals the use points stored in the database server 23 at predetermined intervals, and stores the totaled use points in the database server 23. Then, at any time or a predetermined date and time, the billing server 28 bills the user of the apparatus 1 for the use thereof based on the use points stored in the database server 23.

According to the system of FIG. 3, the use data collection center 11 collects the use data of each of the apparatuses $1_1$ through $1_N$ and converts the collected data to the respective use points. Therefore, the collection and the conversion of the use data can be performed with efficiency.

[In The Case Where The Apparatus 1 Displays The Use Point Value]

A description will be given, with reference to FIG. 7, of the case where the use point value is displayed on an apparatus such as an MFP.

Figure 7:
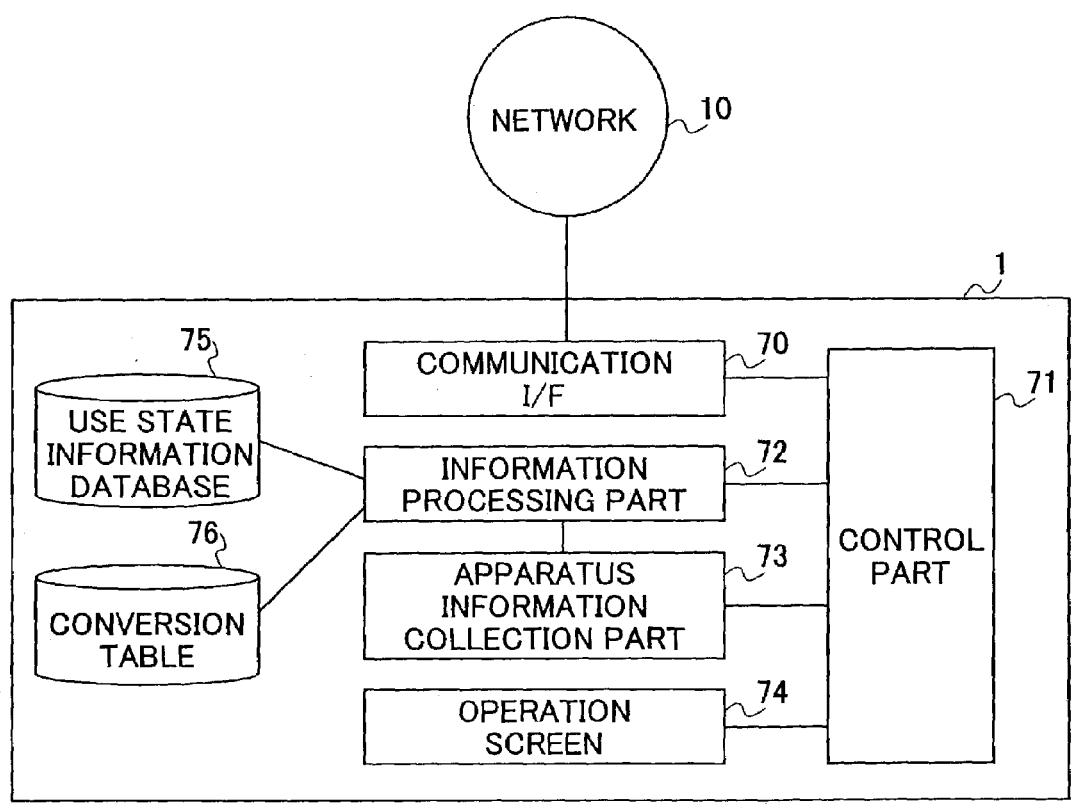
FIG. 7 is a diagram showing another configuration of the apparatus according to the embodiment of the present invention.

FIG. 7 is a diagram showing another configuration of the apparatus 1 according to this embodiment. In FIG. 7, the same elements as those of FIG. 4 are referred to by the same numerals.

The apparatus 1, which is an apparatus for office or home use, such as an MFP, a printer, a copier, or a facsimile machine, includes the communication I/F 70, the control part 71, the information processing part 72, the apparatus information collection part 73, the operation screen 74, a use state information database 75, and a conversion table 76 in its main body.

The control part 71 controls the entire apparatus 1. In addition, the control part 71 controls the communication I/F 70, the information processing part 72, the apparatus information collection part 73, and the operation screen 74.

The information processing part 72, which is connected to the use state information database 75 and the conversion table 76, collects information including the use data of the apparatus 1, and stores the information in the use state information database 75. Further, the information processing part 72 converts the use data of the apparatus 1 to use points referring to the conversion table 76, and stores the use points in the use state information database 75. The apparatus information collection part 73 totals the use points based on a predetermined unit at predetermined intervals, and stores the totaled use points in the use state information database 75 according to the operation of the information processing part 72. The operation screen 74 is formed of a touch panel. By following instructions displayed on the operation screen 74, the apparatus and/or service use data can be input, and the present use data or the use data for a predetermined period of time can be displayed.

The use data or the totaled use points of the apparatus 1 may be transmitted to an external apparatus via the communication I/F 70 as required. That is, the totaled use points are collected via the network 10 by an external apparatus such as the use data collection center 11, and charging is performed based on the collected use points. This reduces the amount of charging-related data flow on the network 10.

If the apparatus 1 has a normal mode and a power-saving mode, the use points may be calculated in each of the modes and displayed as required.

The client can determine, referring to the calculated use points of each of the modes, which of the two is the more suitable, to frequently switch off the power or to use the power-saving mode. This helps the client save power and reduce costs.

In the present invention, the following items are suitably converted to the use points, for instance.

Use of Apparatus

In converting the use of the apparatus 1 to use points, different conversions may be performed in the normal mode and the power-saving mode since the degree of consumption of expendable supplies differs between the normal mode and the power-saving mode.

Further, different conversions may be performed in color printing or copying and monochrome printing or copying.

Replenishment of expendable supplies

Technical fees for periodic checks or failure recovery operations

Provision of operating instructions

Function upgrading

Consultation service by phone, etc.

Additional memory installation

Additional function installation

According to the embodiment of the present invention, appropriate, equitable, and simple charging, easy for the users to understand, can be performed without complicating the price system for the use of a high-performance apparatus such as an MFP.

The present invention is not limited to the specifically disclosed embodiment, but variations and modifications may be made without departing from the scope of the present invention.

The present application is based on Japanese priority application No. 2002-084551 filed on Mar. 25, 2002, the entire contents of which are hereby incorporated by reference.

What is claimed is:

1. A charging method using a use point that is a unit of charging common to a plurality of apparatuses, the charging method comprising the steps of:
   (a) converting a result of use of each function of one of the apparatuses to use points for each of a plurality of operation modes of the one apparatus using an information processor of the apparatus, the operation modes further include a normal mode and a power-saving mode, and a use point being a predetermined unit for charging a user of the apparatus for use of a function of the apparatus;
   (b) totaling the use points of said one apparatus for said each operation mode obtained in said step (a);
   (c) displaying charges to the user for the use of the functions of the one apparatus based on the use points totaled in said step (b), wherein said step (c) further comprises the step of selecting, by the user, at least one of the operation modes based on the use points which are converted and totaled for each of the operation modes; and
   (d) charging the user for the use of the functions of the one apparatus based on the use points totaled in said step (b) and the user selection made in said step (c).

2. The charging method as claimed in claim 1, further comprising a step of (e) obtaining, via a network, the result of the use of each of the functions of the one apparatus which result is converted to the use point in said step (a).

3. The charging method as claimed in claim 1, further comprising the step of (e) collecting, via a network, the use points totaled in said step (b),
   wherein said step (c) charges for the use of the functions of said one apparatus based on the use points collected in said step (e).

4. The charging method as claimed in claim 3, wherein said step (c) charges, based on a billing address of the one apparatus, for the use of the functions of the one apparatus based on the use points collected in said step (e).

5. The charging method as claimed in claim 1, wherein the one apparatus is a multi-function printer.

6. The charging method as claimed in claim 1, wherein said step (b) totals the use points of the one apparatus obtained in said step (a) based on the predetermined unit at predetermined intervals.

7. The method as claimed in claim 1, wherein each of said steps (a), (b). and (c) is performed automatically by a computer.

8. A charging method using a use point that is a unit of charging common to a plurality of services provided for an apparatus, the charging method comprising the steps of:
   (a) obtaining a result of use of each of the services, the result being generated automatically in or input externally to the apparatus;
   (b) converting the result of use of each of the services to a corresponding use point for each operation mode of the apparatus using an information processor of the apparatus, the operation modes further include a normal mode and a power-saving mode, and the use point being a predetermined unit for charging a user of the apparatus for use of a service provided for the apparatus;
   (c) totaling the use points of the services for said each operation mode obtained in said step (b);
   (d) displaying charges to the user for the use of the services based on the use points totaled in said step (c), wherein said step (d) further comprises the step of selecting, by the user, the operation mode based on the use points which are converted and totaled for each of the operation modes; and
   (e) charging the user for the use of the apparatus and the services based on the use points totaled in said step (c) and the user selection made in said step (d).

9. The charging method as claimed in claim 8, further comprising a step of (f) obtaining, via a network, the result of the use of each of the services which result is converted to the use point in said step (b).

10. The charging method as claimed in claim 8, further comprising a step of (f) collecting, via a network, the use points totaled in said step (c), wherein said step (d) charges for the use of the services based on the use points collected in said step (f).

11. The charging method as claimed in claim 10, wherein said step (d) charges, based on a billing address of the services, for the use of the services based on the use points collected in said step (f).

12. The charging method as claimed in claim 8, wherein said step (c) totals the use points of the services obtained in said step (b) based on the predetermined unit at predetermined intervals.

13. The charging method as claimed in claim 8, wherein each of said steps (a), (b), (c), and (d) is performed automatically by a computer.

14. A charging method using a use point that is a unit of charging common to use of an apparatus and a service provided for the apparatus, the charging method comprising the steps of:
   (a) obtaining a result of use of each of the apparatus and the service, the result being generated automatically in or input externally to the apparatus;
   (b) converting the result of use of each of the apparatus and the service to use points for each operation mode of the apparatus using an information processor of the apparatus, the operation modes further include a normal mode and a power-saving mode, and a use point being a predetermined unit for charging a user of the apparatus for use of the apparatus and the service;
   (c) totaling the use points of the apparatus for said each operation mode and the service obtained in said step (b);
   (d) displaying charges to the user for the use of the apparatus and the service based on the use points totaled in said step (c), wherein said step (d) further comprises the step of selecting, by the user, the operation mode based on the use points which are converted and totaled for each of the operation modes; and
   (e) charging the user for the use of the apparatus and the service based on the use points totaled in said step (c) and the user selection made in said step (d).

15. The charging method as claimed in claim 14, further comprising a step of (f) obtaining, via a network, the result of the use of each of the apparatus and the service which result is converted to the use point in said step (b).

16. The charging method as claimed in claim 14, further comprising a step of (f) collecting, via a network, the use points totaled in said step (c), wherein said step (d) charges for the use of the apparatus and the service based on the use points collected in said step (f).

17. The charging method as claimed in claim 16, wherein said step (d) charges, based on a billing address of the apparatus and the service, for the use of the apparatus and the service based on the use points collected in said step (f).

18. The charging method as claimed in claim 14, wherein the apparatus is a multi-function printer.

19. The charging method as claimed in claim 14, wherein said step (c) totals the use points of the apparatus and the service obtained in said step (b) based on the predetermined unit at predetermined intervals.

20. The charging method as claimed in claim 14, wherein each of said steps (a), (b), (c), and (d) is performed automatically by a computer.

21. An imaging apparatus outputting a use point that is a unit of charging common to a plurality of apparatuses, the imaging apparatus comprising:
   a conversion part configured to convert a result of use of each of the functions of the imaging apparatus to a corresponding use point for each operating mode of the imaging apparatus;
   a totaling part configured to total the use points of the functions for each operating mode obtained in said conversion part, a use point being a predetermined unit for charging a user of the apparatus for use of a function of the apparatus, and the operation modes further include a normal mode and a power-saving mode; and
   an output part configured to output the use points totaled in said totaling part, wherein said output is based on which mode of operation is selected by the user, and the use points are converted and totaled for each of the operation modes so as to allow the user to determine which mode to select.

22. The imaging apparatus as claimed in claim 21, wherein said output part outputs the totaled use points on a display.

23. The imaging apparatus as claimed in claim 22, wherein the display comprises a touch panel so that data on the use of each of the functions of the imaging apparatus can be input through the display.

24. The imaging apparatus as claimed in claim 21, further comprising a storage part storing a table correlating data on the result of use of each of the functions with the corresponding use points thereof, so that said conversion part refers to the table in converting the result of use of each of the functions of the imaging apparatus to the use point.

25. The imaging apparatus as claimed in claim 21, further comprising a collection part collecting data on the result of use of each of the functions of the imaging apparatus for conversion to the use point.

26. The imaging apparatus as claimed in claim 21, further comprising a communication interface connected to a network so that data on the result of use of each of the functions of the imaging apparatus or the use points may be transmitted via the network to an external apparatus.

27. The imaging apparatus as claimed in claim 21, wherein said totaling part totaling the use points of the functions based on a predetermined unit at predetermined intervals.

28. A method for charging, via an electronic network with respect to each of a plurality of apparatuses, for at least one of use of one of the apparatuses and use of a service provided to the apparatus, the apparatus having a plurality of functions and a plurality of operation modes and being connected to the electronic network, the method comprising the steps of:
   (a) converting data on the at least one of the use of the apparatus and the use of the service to use points that are units common to the use of the apparatus and the use of the service using an information processor of the apparatus, a use point being a predetermined unit for charging a user of the apparatus for use of the apparatus and the service;
   (b) totaling the use points obtained in said step (a) on at least one of a function basis and an operation-mode basis, wherein the operation modes further include a normal mode and a power-saving mode; and
   (c) storing the totaled use points;
   (d) outputting the stored use points to an external apparatus through the electronic network in response to access from the external apparatus; and
   (e) charging the user for the at least one of the use of the apparatus and the use of the service based on the use points output in said step (d).

* * * * *